March 31, 1959
C. GELMAN
2,880,071
PROCESS FOR DETECTION AND DETERMINATION OF
FLUID MIXTURE COMPONENTS
Filed Feb. 21, 1957
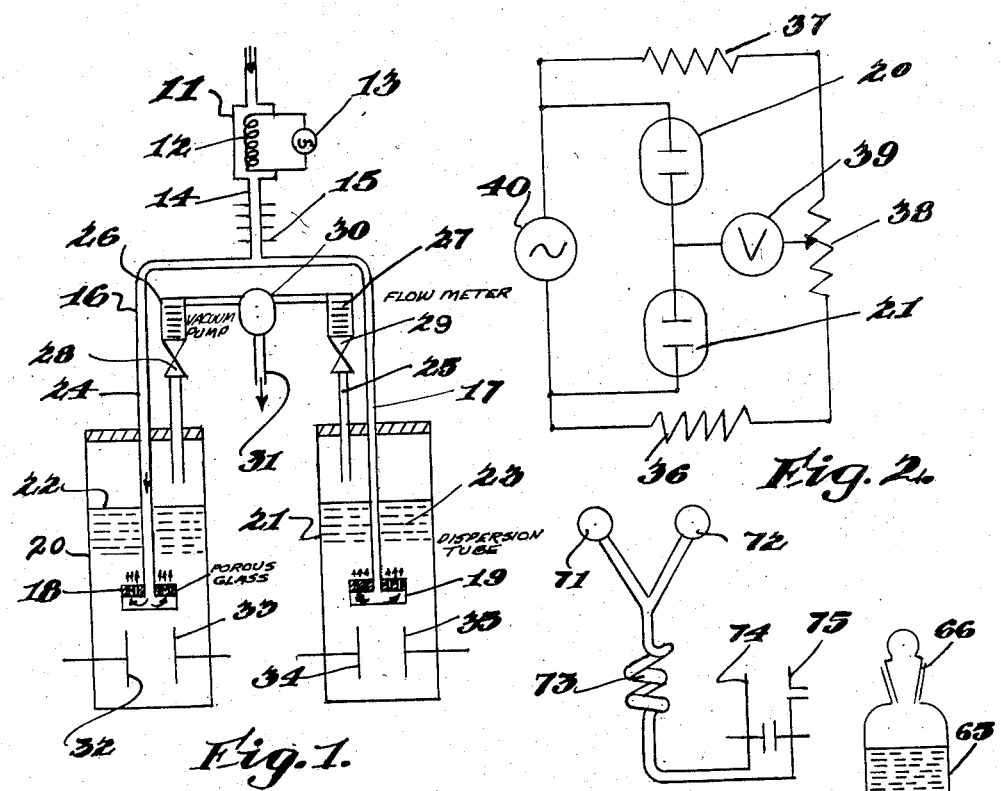
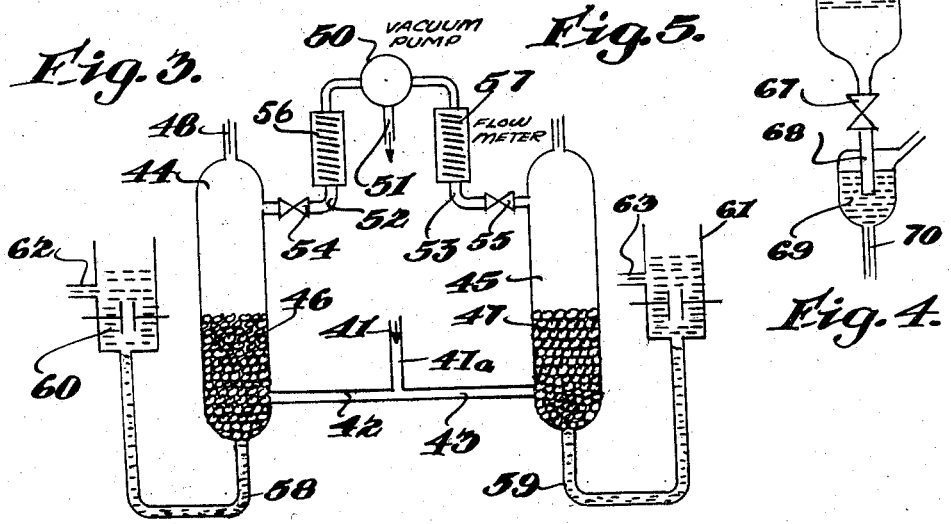
INVENTOR.
Charles Gelman
BY
Robert van Sickler
ATTORNEY United States Patent Office 2,880,071
Patented Mar. 31, 1959.

2,880,071

PROCESS FOR DETECTION AND DETERMINATION OF FLUID MIXTURE COMPONENTS

Charles Gelman, Louisville, Ky., assignor of one-half to Resources Research, Inc., a corporation Application February 21, 1957, Serial No. 641,703

6 Claims. (Cl. 23—230)

This invention relates to process and apparatus for the detection and quantitative determination of specific components present in fluids, and particularly those found as traces in the air that are of extremely toxic nature to vegetation and cattle, such as hydrogen fluoride and fluoride and fluoro-organic vapors and fumes occurring in the vicinity of industrial plants and due to their employment as in the catalytic conversion of hydrocarbons or to discharges in the flue exhausts as in the electrolytic separation of aluminum and treatment of phosphate rock for fertilizer use. Such pollution of the air by industrial operations may be intermittent or even accidental; and the invention therefore further contemplates a continuous operation and measurement so that immediate corrective action can be taken at the times the concentrations reach a dangerous level, which may be a few parts per billion parts of air.

Briefly stated, the invention resides in providing two solutions, one containing an agent selectively reactive with the component to be determined and forming a compound that reduces the electrical conductivity of the solution and the other solution made equally conductive by means of an inert salt, dividing the fluid to be analyzed into two equal streams, passing the streams through the solutions and measuring the conductivity difference; if the conductivity of both solutions increases or decreases the same amount, no change is registered on the indicating meter. For instance, when the component to be determined is hydrogen fluoride in air, a lanthanum fluoride of much lower ionic mobility than the original solution is formed and the conductivity accordingly is decreased; no reaction occurs in the second solution, but the solubility of hydrogen fluoride therein increases the conductivity; the indicating meter then registers the sum of the decrease of conductivity in the first solution and the increase in the second, the magnitude of the reading being proportional to the concentration of the hydrofluoride but much greater than would be the case if the conductivity of either solution were measured alone.

In the accompanying drawing there is illustrated apparatus for practicing the process and two types are shown, one for cumulative measurement and the other for continuous measurement. The cumulative type is compact and portable for spot checking concentrations in different areas or other objectives, such as determining levels of concentrations to which workers are exposed within an industrial plant. The continuous type is primarily intended for fixed installations, such as monitoring air within the workroom, measuring pollution in the air outside the factory, measuring concentrations in stack effluents, process streams, process effluents, etc. In the drawing:

Figure 1 shows diagrammatically an apparatus for the cumulative measurement of a specific component in gases or vapors;

Figure 2 shows an electrical circuit for use in conjunction with the apparatus for measuring conductivity difference;

Figure 3 shows diagrammatically an apparatus for the continuous determination of the component;

Figure 4 shows a solution-feeding means for the apparatus of Figure 3; while

Figure 5 shows a modification for analyzing liquid streams.

Referring to Figure 1, a sample of the air or gas to be analyzed is drawn into the heating chamber 11. The stream can be heated by a hot wire 12 of nichrome, platinum, etc. and the wire heated from a voltage source 13 (A.C. or D.C.) to the degree needed to effect pyrolysis or pyrohydrolysis. Such a furnace is called for when fluoride dusts or fluoro-organic compounds are to be analyzed, but not for the analysis of a gas containing hydrogen fluoride.

From the chamber 11 the heated sample passes through a pipe 14 provided with cooling fins 15 to conduct away heat from a sample that has been heated to high temperature. From the pipe 14 the gas is divided into streams by conduits 16 and 17 that have at their exit ends glass dispersion tubes 18 and 19 to break the gas into small bubbles within the conductivity chambers 20 and 21; any hydrogen fluoride, for example, in the streams is absorbed by solutions 22 and 23 selected for the purpose, in the conductivity chambers. Exit pipes 24 and 25 conduct the gaseous streams from the chambers to flow meters 26 and 27, the flow being controlled by valves 28 and 29 to equalize the streams, and from the meters they are drawn by a vacuum pump 30 and discharged at outlet 31; a vacuum-operated sampling system is preferable to a compression system, since it avoids errors arising from adsorption on the walls of the pumping chamber. Within the conductivity chambers are sealed spaced electrodes 32, 33, and 34, 35, the spacing being fairly equal so that both cells have the same constant; but other known shapes can be substituted.

An electrical circuit for use with the above apparatus is shown in Figure 2 as consisting of resistors 36 and 37, connected in series with the electrodes of the conductivity cells 20 and 21, and with a potentiometer 38; a voltmeter or galvanometer 39 is connected across from the potentiometer to the line connecting the two cells, and the current for the bridge circuit can be alternating source 40.

A typical application of the invention is the determination of hydrogen fluoride in air. A solution was made in acidified water (0.01 percent of nitric acid) of 10 mg. per liter of lanthanum nitrate, and a second solution in similarly acidified water with enough sodium chloride to have an electrical conductivity the same as that of the first solution was prepared. In the apparatus of Figure 1 about 20 ml. of the lanthanum salt solution was placed in the chamber 20 and an equal amount of the sodium chloride solution in the chamber 21; the initial conductivity (in arbitrary units) was 159, and the sensitivity of the meter was such that a difference of 0.1 percent change in conductivity between the two cells or chambers could be detected. A sample stream of air flowing at a rate of 10 liters per minute had introduced into it 500 micrograms of hydrogen fluoride over a period of 30 minutes (average concentration 1.7 mmg. hydrogen fluoride per liter), and this stream passed through the apparatus; the meter indicated an increase in resistance of 2.5 percent. While lower concentrations were not tried, the sensitivity of the instruments indicated that concentrations of one-twenty-fifth of that tested could be detected under the same conditions, and more sensitive meter movements can be used. The pyrolysis chamber was not used, since the test was made with hydrogen fluoride; but for decomposing fluoro-organic compounds a temperature of about 700° C. is generally sufficient and for more difficultly decomposable fluorides a temperature of about 900°.

Other gases or components than the fluorides can be determined by appropriate selection of reagents. For example, sulfur dioxide in air can be detected by the change in conductivity of a hydrogen peroxide solution through which the sample stream is passed, the sulphur dioxide being oxidized to sulphuric acid to increase the conductivity; but such a system does not differentiate between suphur dioxide and another chemical as hydrochloric acid, since a change in conductivity takes place with any ionizable gas that is sampled. If, however, the first chamber of the apparatus herein disclosed contains an acidic hydrogen peroxide solution of a neutral salt such as sodium chloride, then the determination is specific to sulphur dioxide.

Concentrations of sulphuric acid fumes or mist in air can be measured by placing an acidic solution of a barium salt in the first chamber and of an inert salt in the second chamber. Concentrations of soluble sulphate in dust and fumes are similarly determined, the only condition being a modification to insure a solution when necessary; dust filters are then omitted, and the fritted gas dispersion tubes are replaced by constricted glass tubes.

Again, concentrations of chlorinated hydrocarbons can be pyrolyzed to free hydrochloric acid and carbon dioxide, and the effluent is absorbed in a solution whose conductivity is measured; an increase in conductivity indicates the presence of chlorinated hydrocarbon, but here too there is a lack of specificity, for free hydrochloric acid, if initially present, will give a change of conductivity as well. If, however, the apparatus herein described is used with the effluent from the pyrolyzing chamber and an equal flow of an unpyrolyzed sample stream through the second conductivity chamber, then the measurement can be made with specificity.

The presence of acetylene can be determined by means of an acidic cuprous chloride solution in the first chamber and of an inert salt in the second chamber.

Figure 3 illustrates a modification of the apparatus in which the concentration of the component in a sample stream to be measured is determined continuously rather than cumulatively as in Figure 1. There is provided a sample inlet 41, which can be the discharge pipe 14 extending from the furnace arrangement 11, 12 and 13 of Figure 1; but in this form the inlet has a filter 41a, such as a plug of glass wool, to separate material that has not been decomposed in the furnace. The inlet leads to the conduits 42 and 43, which subdivide the gas stream into two parts as in Figure 1; conduit 42 extends to the lower end of the gas-liquid contacting chamber 44 and conduit 43 to the lower end of chamber 45. These chambers contain packing material 46 and 47, which can be helices, glass beads or of other suitable materials and shapes. Solutions are fed to the tops of these chambers by inlets 48 and 49, the solution entering chamber 44, for example, being the dilute acidic lanthanum salt solution and the one entering the chamber 45 being the acidic sodium chloride solution for the determination of hydrogen fluoride; both solutions are fed at the same controlled rate. The gases, passing upward in countercurrent to the solutions through the packing material, are exhausted by the vacuum pump 50 through the outlets 52 and 53, controlled by needle valves 54 and 55 and measured by rotameters 56 and 57 and discharged at the outlet 51. The solutions exit through the pipes 58 and 59 to the conductivity chambers 60 and 61, which contain the electrodes as in Figure 1; and the solutions are discharged through outlets 62, 63.

The solution feeding means to the chambers 44 and 45 can be of any type that will give a constant flow of liquid, such as a metering pump. Figure 4 shows for illustration a feeding means that consists of a body or vessel 65 with a stopper 66, a stopcock 67, tube 68, constant head reservoir 69 and capillary tube (48 or 49) extending from the reservoir; the constant head thus provided in the reservoir 69 gives a constant flow through the capillary tube, the rate depending on the head and the bore of the tube.

The operation of the modification of Figure 3 differs from the form in Figure 1 in the provision of a constant flow of the solutions and counterflow of the gases to permit a continuous measurement of the component by means of the electrical circuit that is shown in Figure 2. Initially the valves 54 and 55 are adjusted with the vacuum pump 50 on until the rotameters 56 and 57 indicate that both gaseous streams are equal in rate. The sample stream to be measured is then turned on, and the solutions as well, to determine the component as explained above. The countercurrent flow provides a scrubbing of the gases by the solutions, but other types of apparatus than the one described can be substituted to accomplish the same end. The optimum dimensions of the chambers depend on the nature of the packing material and the sensitivity desired. The pipes 58 and 59 and the conductivity cells 60 and 61 should be of relatively small capacity to minimize the time of travel therethrough. The meter 39 of the bridge circuit having been initially balanced, can be calibrated to read directly in concentration units under a given set of solution and sample flow conditions.

When the fluid is to be analyzed is a liquid, the modification shown in Figure 5 is used; this illustrates one-half of the apparatus, it being duplicated for the analyzing of two identical sampling streams of the liquid and the comparative measurement. The sample stream enters the apparatus from a controlled rate-metering pump 71 and a similar pump 72 feeds the testing solution into the sample stream. These streams commingle in a coil tube 73, and from the coil pass to the conductivity measuring chamber 74 to be discharged at outlet 75. In the duplicate part of the apparatus the sample stream is mixed with the inert salt solution, and the conductivity chambers connected by the circuit of Figure 2, the meter having first been adjusted to give no deflection.

In the operation of the modification of Figure 5, a stream of a calcium salt in water solution, for example, is mixed with an acidified sodium oxalate solution in the illustrated half of the apparatus and an equal flow of the calcium salt solution is mixed with an acidified inert salt solution in the duplicate half of the apparatus; the difference in conductivity of the two mixtures is measured. For determining the presence of a lead salt in solution, one stream is mixed with an acidified sodium chromate solution, and the other stream with an acidified neutral salt solution. For barium salts in solution, sodium chromate solution is used. Phosphoric acid solutions are determined by the use of bismuthyl perchlorate.

The sensitivity of the measurements can be controlled by the ratio of the sampling rate to the amount of the solution; if a small amount of solution is used with a comparatively high sampling rate, the sensitivity will be high. But the exact conditions for the measurement will depend on the requirements; thus a much lower sensitivity may be desirable for analyzing work room air than for air pollution measurements outside. Under any given set for sampling conditions, the meter can be calibrated—as by preparing gases having different amounts of hydrogen fluoride and noting the pointer position on the scale—so that the hydrogen fluoride concentration can be determined directly from the meter deflection.

An evident outstanding advantage that the process has over other processes is its high degree of specificity. This is very important, particularly in the measurements of air pollution; the concentration of hydrogen fluoride may be very small in an air stream containing other impurities in rgeater concentrations, but by measuring the comparative conductivity as this invention provides, the hydrogen fluoride concentration can be determined. Another advantage resident in the comparative method is the compensation for temperature changes, since the conductivity in both is equally affected.

I claim:
1. Process for determining presence and concentration of a component of a fluid mixture which comprises dividing the mixture into two streams of equal flow, passing one of the streams in contact with an acidic solution containing an agent selectively reactive with the component to yield a solution of lowered ionic mobility, passing the other stream in contact with an acidic solution containing an inert salt in amount to equalize its electrical conductivity with that of the first mentioned solution prior to the passage of the stream, and measuring the difference in conductivity of the two solutions during the passing of the streams.

2. Process for determining presence and concentration of hydrogen fluoride in a gaseous mixture which comprises dividing the mixture into two streams of equal flow, passing one of the streams in contact with an acidic solution containing a lanthanum salt, passing the other stream in contact with an acidic solution containing an inert salt added prior to the passage of the stream in amount to equalize its electrical conductivity with that of the first mentioned solution, and measuring the difference in conductivity of the two solutions during the passage of the streams.

3. Process for determining presence and concentration of a chlorinated hydrocarbon in a gaseous mixture which comprises dividing the mixture into two streams of equal flow, passing one of the streams through a furnace to pyrolize the hydrocarbon and to free hydrochloric acid and carbon dioxide and the effluent through an acidified solution, passing the non-pyrolyzed stream through a second solution acidified prior to the passage of the stream to be of equal electrical conductivity as the first solution, and measuring the difference in conductivity of the two solutions during the passage of the streams.

4. Process for determining presence and concentration of a calcium salt in water solution which comprises dividing the solution into two streams, passing one of the streams in concurrent flow with a sodium oxalate solution, passing the other stream in concurrent flow with an inert salt solution made prior to the passage of the stream to be of equal electrical conductivity as the sodium oxalate solution, and thereafter measuring the difference in conductivity of the two streams.

5. Process for determining presence and concentration of a component of a fluid mixture which comprises dividing the mixture into two streams of equal flow, passing one of the streams in countercurrent contact with an acidic solution containing an agent selectively reactive with the component to yield a solution of lowered ionic mobility, passing the other stream in countercurrent contact with an acidic solution containing an inert salt in amount to equalize its electrical conductivity with that of the first mentioned solution prior to the passing of the streams, and measuring the difference in conductivity of the two streams during the passing of the streams.

6. Process for determining presence and concentration of a component in a liquid mixture which comprises dividing the mixture into two streams of equal flow, commingling one of the streams with an acidic solution containing an agent selectively reactive with the component to yield a solution of lowered ionic mobility, commingling the other stream with an acidic solution containing an inert salt in amount to equalize its electric conductivity with that of the first mentioned solution prior to commingling, and measuring the difference in conductivity of the streams after the commingling.

References Cited in the file of this patent

UNITED STATES PATENTS

| | | |
|---|---|---|
| 1,375,933 | Rideal et al. | Apr. 26, 1921 |
| 1,944,804 | Ornstein | Jan. 23, 1934 |
| 2,289,610 | Wallace | July 14, 1942 |

FOREIGN PATENTS

| | | |
|---|---|---|
| 464,902 | Great Britain | Apr. 27, 1937 |

OTHER REFERENCES

Czuha et al.: "Inst. Soc. of America Proceedings," vol. 9, part 2, Paper No. 54–22–3.